May 24, 1932.  F. V. D. LONGACRE  1,859,879

VALVE MECHANISM

Filed April 11, 1930   2 Sheets-Sheet 2

INVENTOR.
Frederick V.D. Longacre
BY
HIS ATTORNEY.

Patented May 24, 1932

1,859,879

UNITED STATES PATENT OFFICE

FREDERICK V. D. LONGACRE, OF YONKERS, NEW YORK, ASSIGNOR TO INGERSOLL-RAND COMPANY, OF JERSEY CITY, NEW JERSEY, A CORPORATION OF NEW JERSEY

VALVE MECHANISM

Application filed April 11, 1930. Serial No. 443,381.

This invention relates to valve mechanisms, but more particularly to a valve mechanism adapted for use in connection with compressors, blowers, pumps and the like for either controlling the admission of air and gas into the compressor or the discharge of the compressed fluid from the compressor, depending upon whether the valve mechanism is intended to serve as an inlet valve or as a discharge valve.

More particularly the invention relates to valve mechanisms in which the valve plate is controlled electro-magnetically. The mechanism may comprise a pair of stop members, such as a valve seat and its stop plate which are arranged to form a space therebetween for the accommodation of a valve plate and forming the range of movement of said valve plate.

One of the stop members, that is, either the valve seat or the stop plate is adapted to serve as a magnet for controlling the movement of the valve plate. The energizing coil may accordingly be imbedded in either the stop plate or the valve seat for controlling the valve plate which forms an armature for the magnet.

One object of the invention is to enable a compressor or like machine to which the valve mechanism may be applied to be unloaded at any point in the cycle of operation of the compressor.

Another object is to insure the instant actuation of the valve plate for the purpose of unloading the compressor whenever the receiver pressure reaches that predetermined value which it is desired to maintain.

Other objects will be in part obvious and in part pointed out hereinafter.

Figure 1:
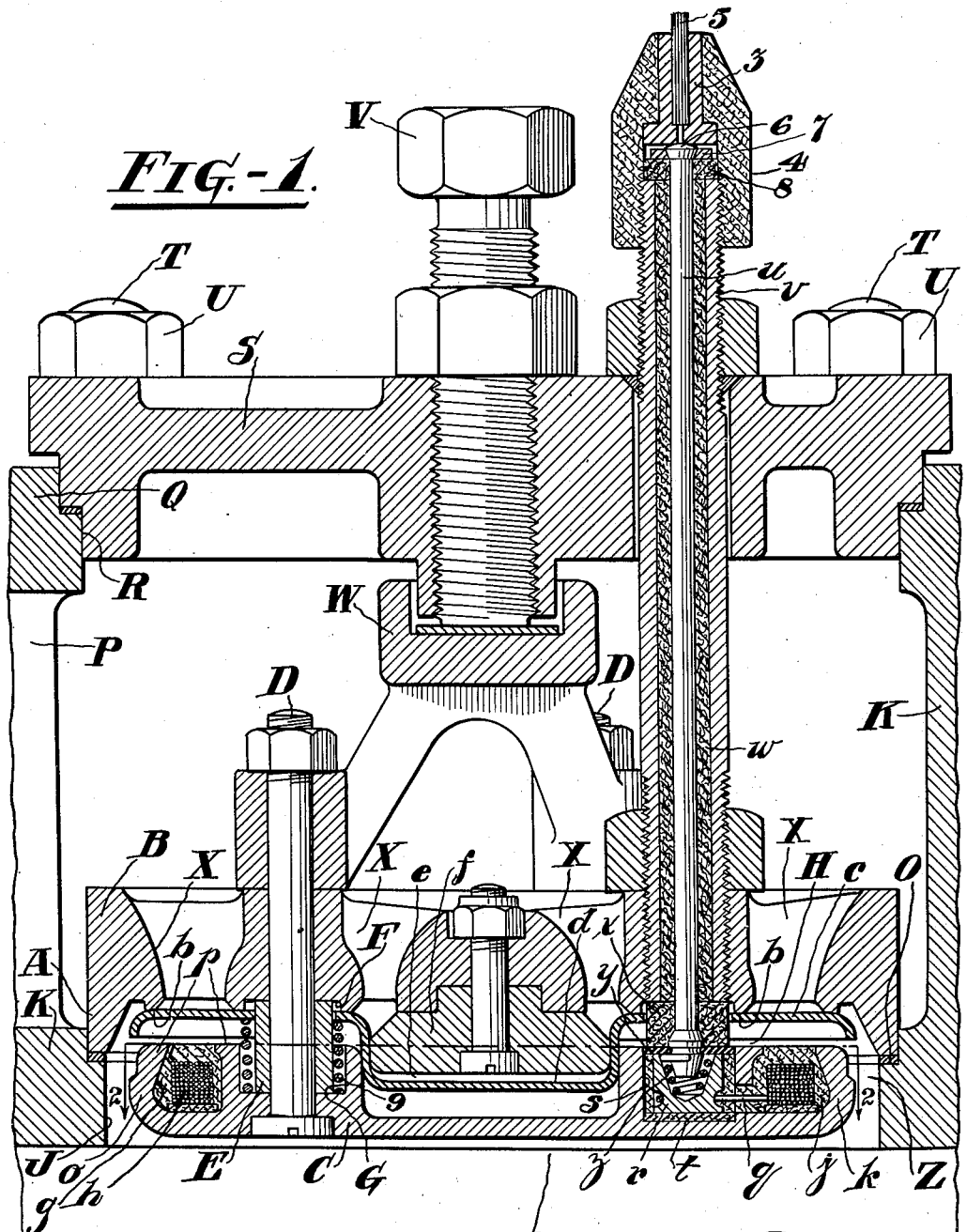
Figure 2:
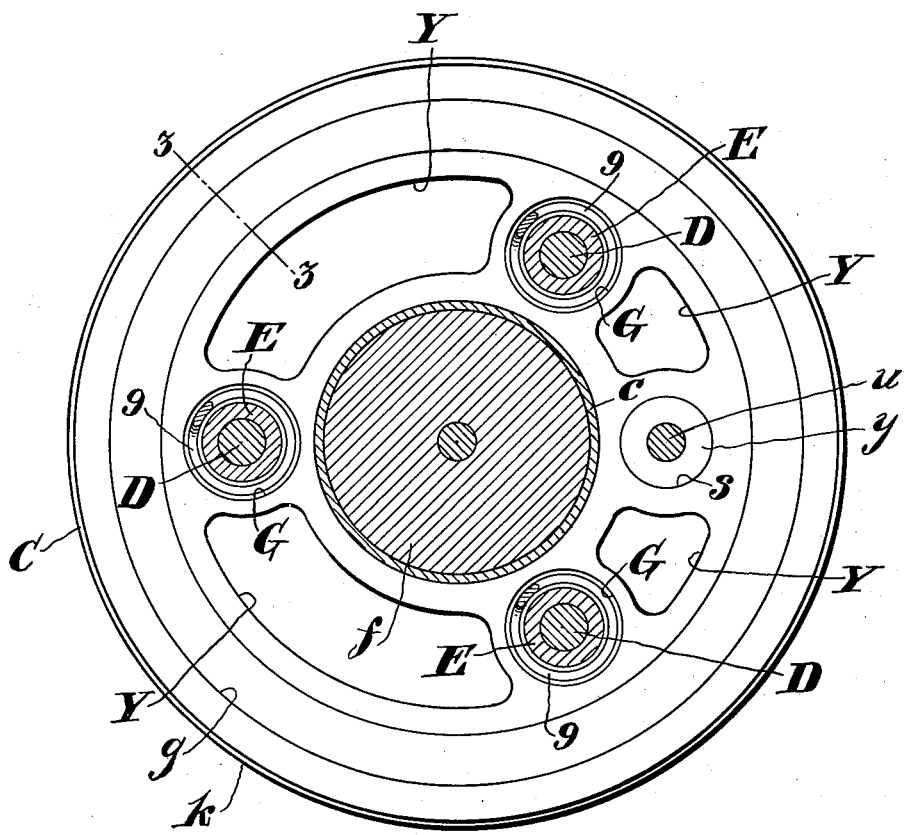
Figure 3:
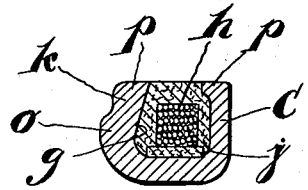

In the accompanying drawings illustrating the invention and in which similar reference characters refer to similar parts, Figure 1 is a sectional elevation of a valve mechanism constructed in accordance with the practice of the invention and showing an arrangement thereof in a compressor cylinder, Figure 2 is a transverse view taken through Figure 1 on the line 2—2 looking in the direction indicated by the arrows, and Figure 3 is a transverse view taken through Figure 2 on the line 3—3.

Referring more particularly to the drawings, a valve mechanism constructed in accordance with the practice of the invention and designated generally by A is shown, for the purpose of illustration, as an inlet valve and comprises a valve seat B and a stop plate C which may be secured to the valve seat B by bolts D arranged intermediate the axes and peripheries of the valve seat and the stop plate. Three bolts D are shown for this purpose and on each bolt D is disposed a spacer E in the form of a sleeve which seats with its ends in sockets F and G of the valve seat and the stop plate C to hold these elements in such relative positions as to form a space H therebetween.

The valve mechanism A, as is customary, is disposed in the valve opening J in an inner wall K of a compressor cylinder L, and the valve seat may seat against a shoulder O in the wall K.

The medium intended to be compressed, such as air or gas, may flow to the valve mechanism through an inlet passage P formed by the inner wall K and an outer wall Q of the cylinder L. In the outer wall Q of the cylinder and suitably aligned with the valve opening J is an opening R for the accommodation of a cover plate S which extends partly into the opening R and is secured to the cylinder L in any suitable manner, as for instance, by means of stud bolts T having nuts U whereby the cover S may be clamped fixedly in position.

In addition to its function as forming a closure for the opening R, the cover S also serves as a seat for a set screw V whereby the valve mechanism may be securely clamped in position in the wall K. In the present instance the set screw V acts against a spider W which is seated on the valve seat B and is preferably secured fixedly thereto by means of the bolts D.

Communication between the cylinder L and the inlet passage P through the valve mechanism is effected through ports X in the valve seat B and through ports Y in the stop plate C and through an annular space Z between the periphery of the stop plate C and the wall of the opening J. The end surface $b$ of the valve seat B adjacent the space H constitutes a seating surface for a valve plate $c$ which is disposed in the space H to control the ports X in the valve seat B.

The valve plate $c$ may be of any suitable type and in the present instance is illustrated as having a central hood portion $d$, the interior of which forms a cushioning chamber $e$ to prevent sharp impact of the valve plate $c$ against the stop elements. A plug $f$, which may be attached to the valve seat B, extends into the cushioning chamber $e$ and is of only sufficiently smaller diameter than the diameter of the cushioning chamber $e$ so as to assure a gradual admission and exhaust of cushioning fluid into and from the chamber $e$.

In accordance with the present invention, means are provided whereby the movement of the valve plate $c$ may be electro-magnetically controlled to unload the compressor. In the case of an inlet valve, such as that illustrated, this may be brought about by holding the valve plate $c$ open by magnetic attraction during a portion of the compression stroke of the compressor piston for partial unloading or, to maintain the valve plate $c$ constantly open for prolonged periods to effect complete unloading of the compressor. In furtherance of this end the stop plate C is provided with an annular groove $g$ to receive an energizing coil $h$ which may be suitably imbedded in nonconducting material $j$, such as bakelite, arranged about the coil $h$ in the groove $g$.

The groove $g$ opens from the end of the stop plate C adjacent the valve seat B and is located in an annular ring-like portion $k$ of the stop plate C so that the wall or walls $o'$ of the groove $g$ will be of U-shaped cross section in which the free ends of the legs extend in the direction of the valve seat B, thus forming large pole faces $p$ on the inner end of the stop plate C for attracting the valve plate $c$.

One end of the coil $h$ may be suitably connected to the stop plate C and the opposite end $q$ of the coil $h$, which is the portion through which the electric current is introduced to the coil, is connected to an inner terminal plug $r$ disposed in a socket $s$ in the stop plate C and is imbedded in non-conducting material $t$ in the socket $s$.

In the case where, as in the present instance, the valve mechanism A lies at a point remote from the outer surface of the cylinder, such as in the inner wall K, the current used for energizing the coil $h$ may be conveyed thereto by a terminal post $u$ extending through a tube $v$ and which tube may be threaded into the valve seat B in approximately coaxial alignment with the socket $s$ in the stop plate C.

A suitable insulator, such as a fiber tube $w$, is disposed within the tube $v$ to insulate the terminal $u$, and between the innermost end of the tube $v$ and the inner terminal plug $r$ is a bakelite washer $x$ which encircles a portion of the terminal post $u$ to prevent the flow of current from the terminal post $u$ to the valve plate $c$ through which the post $u$ may extend. Between the washer $x$ and the inner terminal plug $r$ is a washer $y$ which may lie in the outer end of the socket $s$. Preferably the washer $y$ is formed of rubber to permit the inner terminal plug $r$ as well as the adjacent end of the terminal post $u$, to readily assume a position coaxial with the tubes $v$ and $w$ without being hampered in its movement by the washer $y$.

As a further precaution intended to assure proper connections between the current conductors, such as the terminal post $u$ and the inner terminal plug $r$, the innermost end of the terminal post $u$ is provided with a connector spring $z$. One end of the spring may be fixedly secured to the terminal post $u$ and the coils thereof are adapted to seat in a tapered socket 2 in the plug $r$. The coils of the spring $z$ may be suitably spaced with respect to the periphery of the terminal post $u$ so that the said spring is capable of some lateral movement relatively to the terminal post. Due to this arrangement, whenever, during the assembling of the valve mechanism, the terminal post $u$ and the terminal plug $r$ become slightly misaligned with respect to each other, the spring connector $z$ may readily adjust its position to compensate for any slight irregularity in the relative positions of these parts and an ample contact may therefore be assured between the terminal post $u$ and the terminal plug $r$.

The electrical current for energizing the coil $h$ may be supplied to the terminal post $u$ in any suitable and convenient manner, as for instance, by a connector 3 disposed within a fiber nut 4 which is threaded on the outer end of the tube $v$. A wire 5 leading from a suitable controlling device may be secured to the connector 3 and the inner end of the connector 3 may be pressed against the adjacent end of the terminal post $u$ by means of the nut 4. The outermost end of the terminal may be in the form of a head 6 seating against a metallic washer 7 which in turn is seated on a fiber washer 8 disposed on the outer ends of the tubes $w$ and $v$.

In order to promptly restore the valve plate to its closed position so that it seats against the seating surface $b$, springs 9 disposed in the sockets G encircle the spacers E whereby they are guided and press against the valve plate $c$.

The following is a brief description of the operation of the invention and its advantages: Let it be assumed that the compressor to which the valve mechanism is applied, is operating under normal conditions. During such times the valve plate c may be held open by magnetism throughout the full intake stroke of the compressor. Upon reversal of the compressor piston the magnet may be de-energized so that the valve plate may be returned to the seat b by the springs 9 at the instant of reversal of the compressor piston. On the return stroke of the compressor piston the air will be compressed and will be discharged into the usual receiver tank in a well known manner.

Whenever the pressure within the receiver tank reaches the predetermined maximum which it is intended to maintain therein, a suitable device, (not shown) but which controls the supply of current to the coil h, may act to energize the said coil and therefore the stop plate C so that the valve plate may be maintained in the open position by the magnetic attraction of these elements throughout a portion of the compression stroke or, whenever it is desired to effect complete unloading of the cylinder L, the magnetism in the coil h and therefore in the stop plate C may be maintained throughout the full cycle of operation of the compressor so that the valve plate c will remain open against the stop plate C until the pressure within the receiver tank has again been lowered below that which it may be desired to maintain.

In practice the present invention has been found to be extremely efficient, particularly when the valve mechanism is being used for partially unloading the cylinder, in which case, of course, the valve plate c is actuated magnetically during each compression stroke of the piston. By effecting the unseating or opening of the valve plate c magnetically the said valve plate c will move uniformly at all points in the direction of the stops against which it will seat evenly, thus preventing localized wear on the valve plate. This is particularly desirable when the valve mechanism is arranged in an inclined position and in which position portions thereof usually lag somewhat in both the opening and closing movements of the valve. Obviously, the leading portions will then first impact against the stop plate C and the valve seat B so that after some usage the portions of the valve plate c which first impact against the stop elements will become worn to an extent where early replacement of the valve plate is required.

I claim:

1. An electro-magnetic valve mechanism comprising a pair of ported stop members arranged to form a space therebetween, a coil in one member and cooperating therewith to form a magnet, a valve plate in the space controlled by the magnet and forming an armature therefor, and means for cushioning the movement of the valve plate.

2. An electro-magnetic valve mechanism comprising a pair of ported stop members arranged to form a space therebetween, a coil connected with a source of electrical current supply and associated with one of the members to form a magnet thereof, a valve plate in the space to control the ports in one member and forming an armature for the magnet whereby it is controlled, and means on the valve plate cooperating with the stop members for cushioning the movement of the valve plate.

3. An electro-magnetic valve mechanism comprising a pair of ported stop members arranged to form a space therebetween, a coil associated with one of the members to form a magnet, a valve plate in the space to control ports in one of the members and forming an armature for the magnet whereby the said valve plate is controlled, and means on the valve plate cooperating with the stop members for cushioning the movement of the valve plate.

4. An electro-magnetic valve mechanism comprising a pair of ported stop members arranged to form a space therebetween, a groove in an end of one of the members, a coil in the groove cooperating with the member to form a magnet, a valve plate in the space to control the ports in one of the members and forming an armature for the magnet whereby the said valve plate is controlled, cooperating means associated with the ported stop members to form a chamber, and means on the valve plate operable in the chamber to act against fluid therein for cushioning the movement of the valve plate.

5. An electro-magnetic valve mechanism comprising a ported valve seat, a stop plate arranged with respect to the valve seat to form a space therebetween, an annular groove in the end of the stop plate adjacent the valve seat, a coil in the groove and grounded to the stop plate to form a magnet, a valve plate in the space to control the ports in the valve seat and being opened by the magnet for which it forms an armature, a hood portion on the valve plate to form a chamber, springs acting against the valve plate for returning the valve plate to the valve seat, and a projection on the valve seat extending into the crown and acting against fluid therein for cushioning the movement of the valve plate.

6. An electro-magnetic valve mechanism comprising a valve seat having a plurality of ports adjacent its periphery, a stop plate secured to the valve seat, spacing members cooperating with the valve seat and the stop plate to form a space therebetween and being arranged intermediate the axes and the peripheries of the valve seat and the stop plate, an annular groove in the stop plate opening into the space substantially opposite the ports in the valve seat, a coil in the groove cooperating with the stop plate to form a magnet, a valve plate coextensive with the stop plate and movable in the space to control the ports, said valve plate being controlled by the magnet, and springs guided by the spacing members and acting against the valve plate to return it to the valve seat when the magnet is deenergized.

In testimony whereof I have signed this specification.

FREDERICK V. D. LONGACRE.